United States Patent Office 3,143,945
Patented Aug. 11, 1964

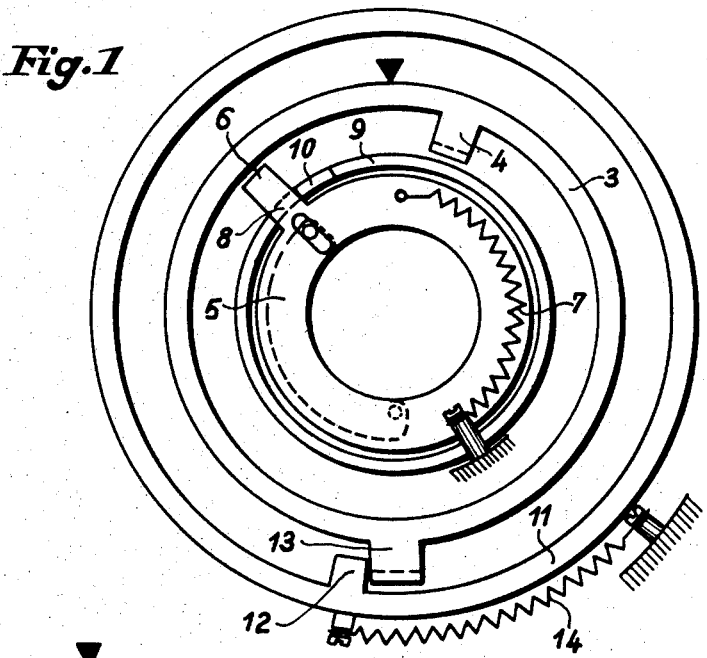
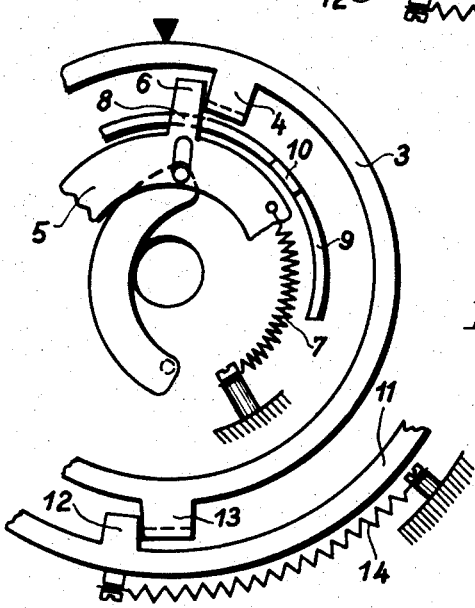

3,143,945
PHOTOGRAPHIC CAMERAS PROVIDED WITH EXCHANGEABLE OBJECTIVES
Christian Ludwig, Oberkochen, Wurttemberg, and Otto Weiss, Aufhausen, Wurttemberg, Germany, assignors to Carl Zeiss, Oberkochen, Wurttemberg, Germany
Filed Sept. 30, 1960, Ser. No. 59,568
Claims priority, application Germany Oct. 2, 1959
3 Claims. (Cl. 95—64)

The invention relates to photographic cameras provided with exchangeable objectives which have each a spring diaphragm device. If is desired to take close-up pictures with cameras of this type by employing adaptor rings or bellows devices, then the function of the spring diaphragm device, which is built into the objective mount, is not the same unless special provisions are being made.

It is known to arrange the elements necessary for transmitting and releasing the spring diaphragm in the interior of the objective mount in such a manner that the operating mechanism is actuated by means located within the camera casing after the objective has been attached to the camera casing. In such a case it is necessary when employing adaptor rings or bellows devices to provide the same with the same control members as the camera in order to retain the function of the spring diaphragm. If the employed adaptor rings or bellows devices do not have these control members, then the spring diaphragm mounted within the objective mount will automatically close to its smallest aperture and it is not possible to open the diaphragm again by means arranged on the objective mount. In order to overcome this disadvantage, it has been proposed heretofore to construct objective mounts which are provided in their interior with elements which render the automatic operation of the diaphragm mechanism ineffective. When employing adaptor rings or bellows devices it is therefore possible by means of these elements to operate the diaphragm without providing the camera with attachable control elements.

It is an object of the present invention to provide a photographic camera with exchangeable objectives each of which contains a spring diaphragm device which during the employment of adaptor rings or bellows devices owing to the corresponding construction of these additional parts is caused to retain its function, or one may also employ simple additional parts which automatically convert the spring diaphragm in the objective mount to a conventional diaphragm which is adjustable by means of a diaphragm adjusting member. Therefore, the diaphragm mounted in the objective mount remains always usable independent of the fact whether the objective is attached to the camera or not.

In the photographic camera according to the invention each objective mount is provided with means for adjusting the diaphragm in response to a diaphragm adjusting member, and within the camera body itself is arranged an element which extends into the mount of the objective attached to the camera. This element is responsive to an actuation of the shutter operating member which causes a tensioning and releasing of the diaphragm. It is of advantage in this connection to provide the diaphragm adjusting member with an abutment projection for the diaphragm groove ring and to provide the diaphragm groove ring also with an abutment, whereby the diaphragm groove ring is pretensioned by a spring in its diaphragm closing direction, while within the camera interior is arranged a ring provided with an axial extension adapted to engage the diaphragm groove ring for the purpose of tensioning and releasing the diaphragm. When the objective has been removed from the camera, the pretensioning spring rotates the diaphragm groove ring until there is established between this ring and the diaphragm adjusting ring a power transmitting connection. Then it is possible to adjust the diaphragm with the assistance of the diaphragm adjusting member.

When the objective is attached to the camera, the axial extension projecting from the camera casing into the objective mount is placed in front of the projection of the diaphragm groove ring. During the tensioning of the shutter this projection rotates the diaphragm groove ring with the tensioning member and thereby the diaphragm is opened to its largest aperture. During the release of the shutter the ring arranged within the camera casing returns to its initial rest position and the projection on this ring releases thereby the diaphragm groove ring. The latter is now rotated under the action of the spring which is connected with it until it engages the projection of the diaphragm adjusting member. The diaphragm adjusting member therefore takes over the function of a diaphragm aperture preselecting ring when the objective has been attached to the camera casing.

In order to couple in photographic cameras provided with a built-in exposure meter the diaphragm preselecting ring directly with the exposure meter, or in order to transmit the position of the diaphragm preselecting ring to the exposure meter, it is advisable to provide the diaphragm adjusting member with a second abutment projection and to arrange within the interior of the camera casing an additional adjustable member provided with an axially directed projection which extends into the objective mount and is positively connected with the second abutment projection of the diaphragm adjusting member.

With these and other objects in view, which will appear hereinafter, the invention will now be described in connection with a specific embodiment with reference to the accompanying drawing, in which:

FIG. 1 illustrates diagrammatically the elements which in a photographic camera operate the diaphragm adjusting device, which diaphragm adjusting elements are arranged within the objective mount;

FIG. 2 is a view similar to FIG. 1, except that the diaphragm has been closed down to its preselected value;

Figure 3:
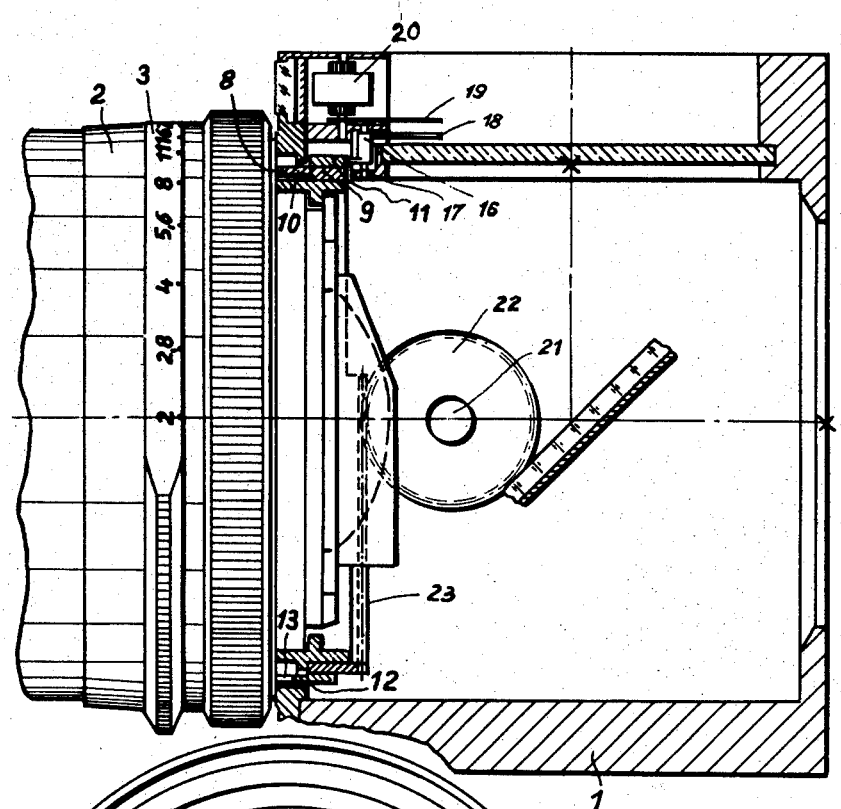
FIG. 3 is a side elevation view, partly in section, of a photographic camera in accordance with the invention.

Referring to FIG. 3, it will be noted that it illustrates a single lens mirror reflex camera the casing of which has been designated with 1. A photographic objective 2 is detachably secured to the front wall of this camera casing. According to FIGS. 1 and 2, the mount for the objective 2 carries a diaphragm adjusting ring 3 which is provided with a radially inwardly extending abutment 4. The objective mount contains also a diaphragm groove ring 5 provided with a radially outwardly extending abutment 6. A helical spring 7 is employed for pretensioning the diaphragm groove ring 5 in closing direction of the diaphragm. The radially outwardly extending abutment 6 of the diaphragm groove ring 5 is provided with an axial extension 8 which projects outwardly from the objective mount as shown in FIG. 3. Within the camera casing 1 is arranged a diaphragm closure ring 9 which is operatively coupled with the shutter actuating mechanism. The diaphragm closure ring 9 is provided with an axial projection 10 which abuts the axial extension 8 of the diaphragm groove ring 5 when the objective 2 is attached to the camera casing 1.

Within the camera casing is also arranged a rotatable transmission ring 11 provided with a radially inwardly directed projection 12 (FIGS. 1 and 2). This projection 12 comes into positive engagement with a radially outwardly directed projection 13 on the diaphragm adjusting ring 3 when the objective is attached to the camera casing. For the purpose of establishing this positive connection there is provided a helical spring 14 attached with one of its ends to the ring 11. The ring 11 is coupled with the control elements of an exposure meter which is built into the camera casing. For this purpose the ring 11 is furnished in axial direction with a control curve of a slight slope, that means the width in axial direction of the ring 11 is made variable. A bell crank lever 16 is pivoted on an axis 17 and rests with its one end against said curve, while the other end is formed as a pointer 18 turning in horizontal plane round axis 17 in correspondence with the slope of the control curve of ring 11. This pointer is reset in accordance with the momentary position of another pointer 19 of an exposure meter 20 and thus the diaphragm aperture preselecting operation is performed. Therefore, the movements of the diaphragm adjusting ring 3 are transmitted to the exposure meter.

Figure 4:
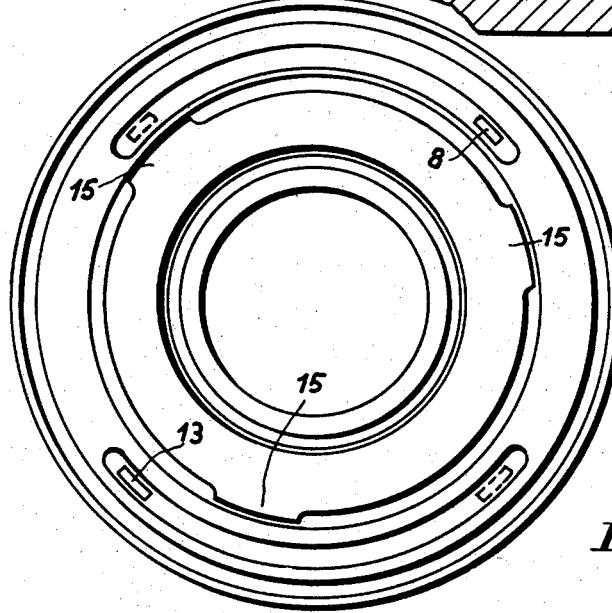
FIG. 4 is a rear view of the objective in its attached position on the camera.

For removably attaching the objective 2 to the camera casing 1 is employed a bayonet coupling of which the parts on the objective mount are designated with 15 in FIG. 4. This FIG. 4 shows very clearly that all coupling elements such as 8 and 13 are arranged along a circular path the diameter of which is greater than the diameter of the circle along which the bayonet parts 15 are arranged.

The operation of the described embodiment of the invention is as follows:

When the objective 2 is not attached to the camera, the spring 7 rotates the diaphragm groove ring 5 until the abutments 6 and 4 come into engagement with one another. Thereupon the rotation of the diaphragm adjusting ring 3 causes an adjustment of the diaphragm aperture in conventional manner.

If the objective 2 has been attached to the camera, the axial projection 8 (FIG. 3) of the diaphragm groove ring 5 is placed in front of the axial projection 10 of the diaphragm closure ring 9 arranged in the camera casing 1. At the same time the radial projection 13 of the diaphragm adjusting ring 3 is placed on one side of the radial projection 12 of the transmission ring 11 mounted in the camera casing 1. The rotative attachment angle of the bayonet coupling is selected to be greater than the diaphragm closure angle. The difference between these two angles may be, for instance, approximately 10 degrees. During the attachment movement of the objective which movement consists of an angular rotation of the objective, the axial projection 10 of the diaphragm closure ring 9 holds the axial projection 8 of the diaphragm groove ring 5 in position and the diaphragm will be completely opened. When this takes place, the spring 7 is tensioned, as it is obvious from FIG. 1. The radial projection 13 of the diaphragm adjusting ring 3 is held by a spring 14 in engagement with the projection 12 of the transmission ring 11 and forms at this point a positive coupling. FIG. 1 illustrates the position of the individual rings when the objective is mounted on the camera casing and when the shutter has been tensioned. It is believed to be clear that in this condition the diaphragm has been opened to its greatest value and, therefore, it is possible in single lens mirror reflex cameras to focus the camera properly and conveniently.

Furthermore, FIG. 1 illustrates that the diaphragm adjusting ring 3 operates in this condition only as a diaphragm pre-selecting ring. Its position is transmitted by the transmission ring 11 to the resetting pointer 18 which is to be brought to coincidence with the pointer 19 of the exposure meter. Of course, it is also possible to change the position of the diaphragm adjusting ring 3 by an adjustment of the ring 11 which in turn is operated by the exposure meter. In such case it is only required to change the connection between the rings 11 and 3.

When now the shutter of the camera is released, the diaphragm closure ring 9 moves from the position shown in FIG. 1 in clockwise direction and in doing so, releases the closure movement of the diaphragm. The diaphragm groove ring 5 under the action of the spring 7 follows the movement of the diaphragm closure ring 9 until the abutment 6 of the ring 5 engages the abutment 4 of the diaphragm adjusting ring 3. When this has been accomplished, the diaphragm is closed down to its preselected value. This position of the parts is illustrated in FIG. 2 which also shows by way of illustration one diaphragm segment 5a.

If now the shutter is again tensioned, the axial projection 8 of the diaphragm groove ring 5 is moved by the axial projection 10 of the diaphragm closure ring 9 until the ring 5 returns to the position shown in FIG. 1 which corresponds to the largest diaphragm aperture. For this purpose a control knob indicated with 21 is pivotally mounted outside the side wall of the camera which knob serves for actuating the shutter tensioning mechanism (not illustrated). By said knob a disk-shaped gear wheel 22 is turned which cams with the toothed front surface 23 of the diaphragm closure ring 9. Thus by turning this ring 9 the diaphragm groove ring 5 is turned into the position which corresponds to the largest diaphragm aperture.

The FIGS. 1 to 4 make it clear that in the illustrated camera and when the latter is to be used for making close-up photographs it is possible to insert adaptor rings or bellows devices between the camera casing 1 and the objective 2. These adaptor rings or bellows devices would, of course, be provided with a corresponding extension of the axial projection 10 of the diaphragm closure ring 9 and of the projection 12 of the transmission ring 11. When the inserted devices have these extensions, the operation of the spring diaphragm is assured. If, however, the adaptor device inserted between the camera casing and the objective does not have these mentioned extensions, then the spring diaphragm in the objective mount is automatically converted into a conventional diaphragm which may be adjusted by rotating the diaphragm adjusting ring 3.

What we claim is:

1. A photographic camera designed to have attached to its casing any one of a plurality of exchangeable objectives, each of which includes an objective mount, a spring diaphragm therein, a diaphragm adjusting ring (3) on said mount, a diaphragm groove ring (5) in said mount having an axial projection (8) extending outwardly of said mount, and coupling means on said mount for detachably securing said objective to said casing, the latter having rotatably mounted therein about the optical axis of said objective a diaphragm closure ring (9) having an axial projection (10) which when the objective is attached to said casing abuts one side of said axial projection (8) on said diaphragm groove ring (5) and moves the diaphragm to its fully open position, manually operable means within said camera for engaging a projection (13) on said diaphragm adjusting ring (3) for moving the latter to a position indicating a preselected diaphragm aperture, said diaphragm adjusting ring (3) having thereon a further radial projection (4) for stopping said diaphragm groove ring (5) when the latter is released by the camera shutter, whereby the diaphragm is adjusted to an aperture which corresponds to said preselected aperture indicated by the position of said diaphragm adjusting ring.

2. A photographic camera designed to have attached to its casing any one of a plurality of exchangeable objectives, each of which includes an objective mount, a spring diaphragm therein, a diaphragm adjusting ring (3) on said mount, a diaphragm groove ring (5) in said mount having an axial projection (8) extending outwardly of said mount, and coupling means on said mount for detachably securing said objective to said casing, the latter having rotatably mounted therein about the optical axis of said objective a diaphragm closure ring (9) having an axial projection (10) which when the objective is attached to said casing abuts one side of said axial projection (8) on said diaphragm groove ring (5) and moves the diaphragm to its fully open position, and a rotatable spring influenced transmission ring (11) within said casing and arranged concentrically about said diaphragm closure ring (9), said transmission ring being provided with a radial projection (12) for engaging a projection (13) on said diaphragm adjusting ring (3) and being operatively connected with a resetting hand (18) which is adapted to be manually adjusted to various exposure indicating positions, whereby upon a rotative adjustment of said transmission ring (11) by said resetting hand said diaphragm adjusting ring (3) is set to a preselected position, said diaphragm adjusting ring (3) having thereon a further radial projection (4) for stopping said diaphragm groove ring (5), when the latter is released by the camera shutter, in a position in which the adjusted aperture of said diaphragm corresponds to said preselected position.

3. A photographic camera designed to have attached to its casing any one of a plurality of exchangeable objectives, each of which includes an objective mount, a spring diaphragm therein, a diaphragm adjusting ring (3) on said mount, a diaphragm groove ring (5) in said mount haing an axial projection (8) extending outwardly of said mount, and coupling means on said mount for detachably securing said objective to said casing, the latter having rotatably mounted therein about the optical axis of said objective a diaphragm closure ring (9) having an axial projection (10) which when the objective is attached to said casing abuts one side of said axial projection (8) on said diaphragm groove ring (5) and moves the diaphragm to its fully open position, and a rotatable spring influenced transmission ring (11) within said casing and arranged concentrically about said diaphragm closure ring (9), said transmission ring being provided with a radial projection (12) for engaging a projection (13) on said diaphragm adjusting ring (3) and being operatively connected with a resetting hand (18) which is adapted to be manually adjusted to various exposure indicating positions, whereby upon a rotative adjustment of said transmission ring (11) by said resetting hand said diaphragm adjusting ring (3) is set to a preselected position, said diaphragm adjusting ring (3) having thereon a further radial projection (4) for stopping said diaphragm groove ring (5), when the latter is released by the camera shutter, in a position in which the adjusted aperture of said diaphragm corresponds to said preselected position, said diaphragm groove ring (5) also having thereon a radial projection (6), and a spring (7) attached to said diaphragm groove ring for moving said last named radial projection thereon in engagement with said projection (4) on said diaphragm adjusting ring (3) when said objective is removed from said casing, thereby permitting said diaphragm adjusting ring to adjust said diaphragm to any desired aperture.

References Cited in the file of this patent

UNITED STATES PATENTS

| | | |
|---|---|---|
| 2,252,573 | Leitz et al. | Aug. 12, 1941 |
| 2,435,752 | Pearce | Feb. 10, 1948 |
| 2,803,182 | Werner | Aug. 20, 1957 |
| 2,887,026 | Rentschler | May 19, 1959 |
| 2,965,012 | Schutz | Dec. 20, 1960 |
| 2,966,105 | Schutz | Dec. 27, 1960 |
| 2,967,472 | Gebele | Jan. 10, 1961 |

FOREIGN PATENTS

| | | |
|---|---|---|
| 891,187 | Germany | Sept. 24, 1953 |
| 1,179,578 | France | Dec. 22, 1958 |